United States Patent [19]

Hook et al.

[11] 4,180,779

[45] Dec. 25, 1979

[54] QPSK DEMODULATOR WITH TWO-STEP QUADRUPLER AND/OR TIME-MULTIPLEXING QUADRUPLING

[75] Inventors: William R. Hook, Los Angeles; Ronald P. Hilberg, Redondo Beach, both of Calif.

[73] Assignee: The United States of America as represented by the Secretary of the Air Force, Washington, D.C.

[21] Appl. No.: 944,440

[22] Filed: Sep. 21, 1978

[51] Int. Cl.² .................................................. H04L 27/22
[52] U.S. Cl. .................................... 329/50; 325/320; 325/346; 329/122
[58] Field of Search ............... 329/50, 104, 110, 122, 329/124; 325/320, 346, 349

[56] References Cited

U.S. PATENT DOCUMENTS 4,097,813  6/1978  Otani et al. ............... 329/124 X

Primary Examiner—Siegfried H. Grimm
Attorney, Agent, or Firm—Joseph E. Rusz; William Stepanishen

[57] ABSTRACT

A QPSK demodulator apparatus utilizing a pair of doubling units in tandem but separated by a bandpass filter to remove any undesired cross products and to eliminate possible noise signal that may be applied to the second doubler. The use of two doubling units to provide a times 4 quadrupling allows the use of heterodyning in order to operate at a lower frequency.

7 Claims, 7 Drawing Figures

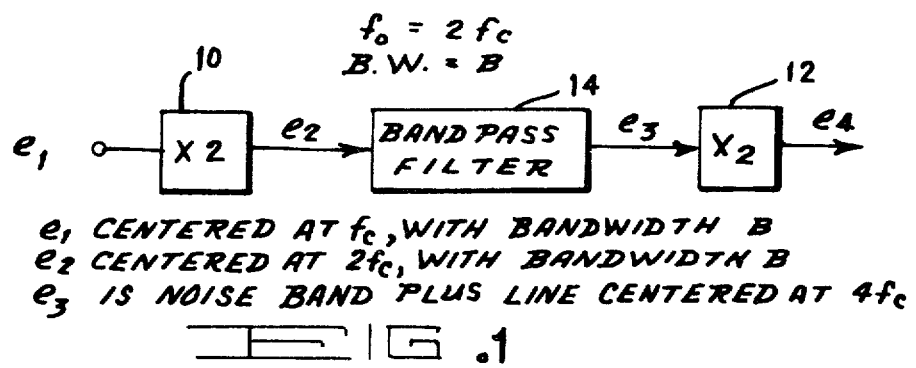
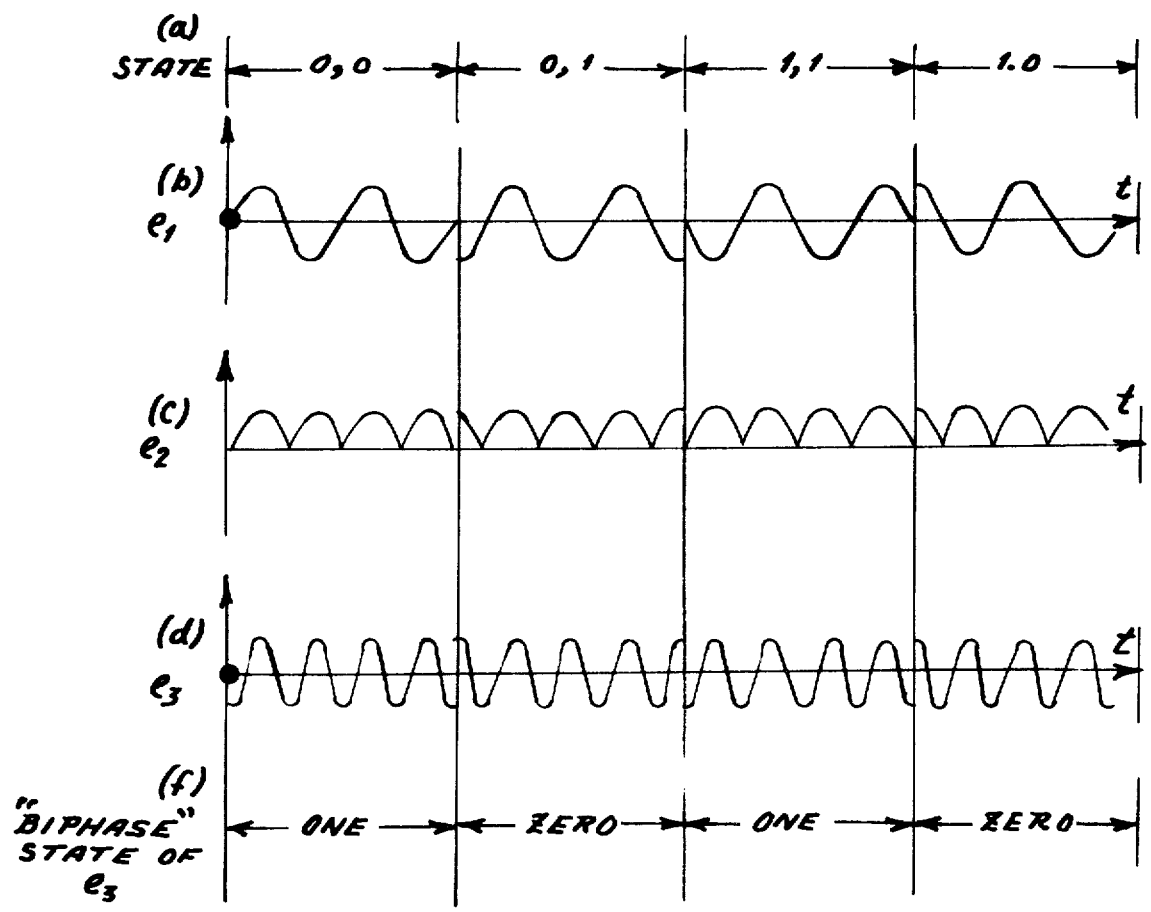

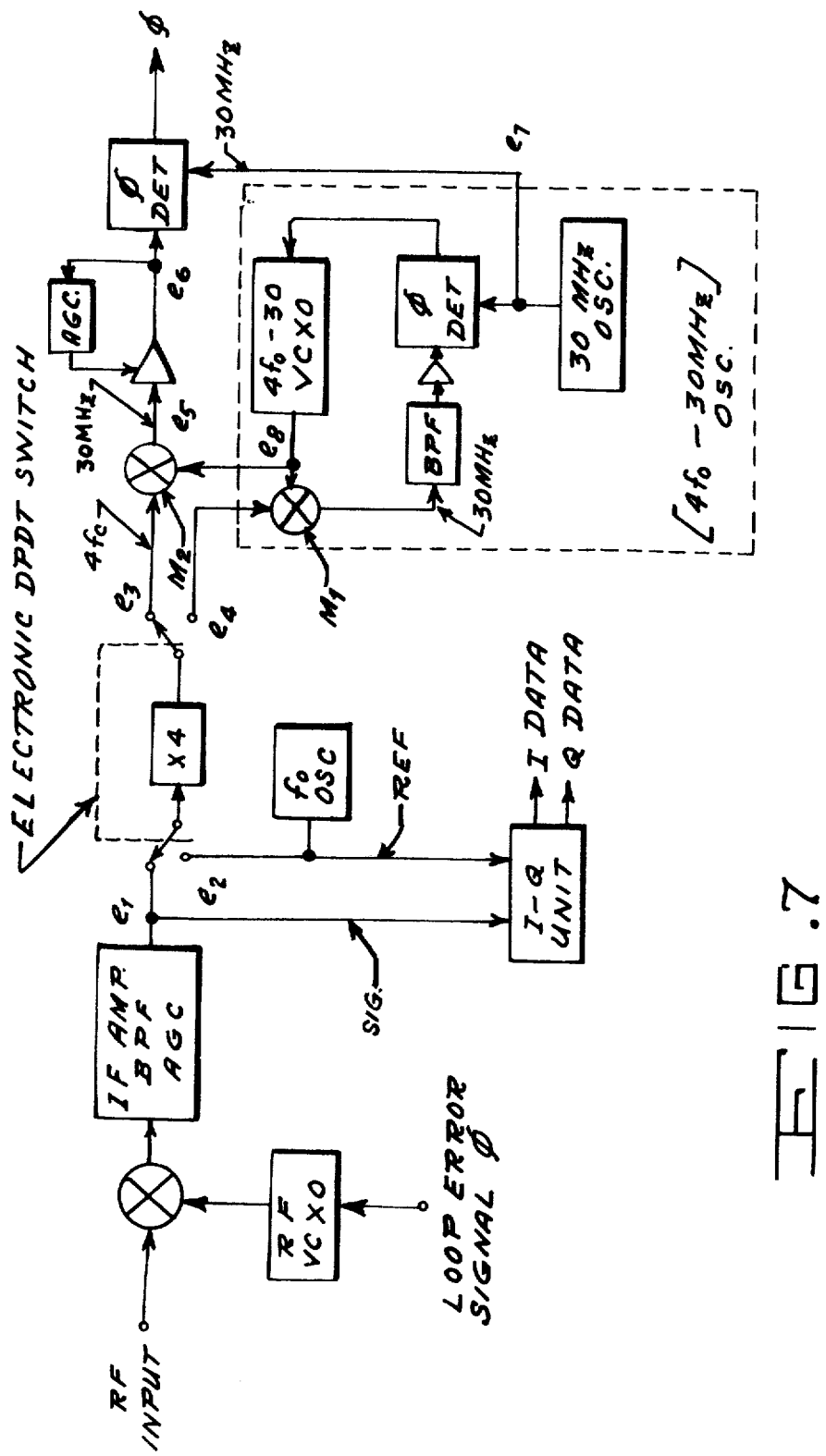

QPSK DEMODULATOR WITH TWO-STEP QUADRUPLER AND/OR TIME-MULTIPLEXING QUADRUPLING

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a demodulator apparatus, and in particular to QPSK demodulator apparatus with a two-step quadrupler and/or time-multiplexing quadrupling.

In the prior art the use of demodulators is quite well known and highly specialized. The specialized field of demodulators includes some sophisticated apparatus such as the modulation wipe off demodulator and the reverse demodulator.

The present QPSK modulation wipeoff demodulator has several serious fundamental problems relating to signal acquisition and to break-lock performance. The reverse demodulator which is a variation of the modulation wipeoff demodulator shares similar common problems. Some of these problems are that a wipeoff demodulator is incapable of distinguishing between a locked signal, an unlocked signal, or amplified receiver noise. This characteristic greatly complicates signal acquisition strategy, and in some applications makes reliable signal acquisition virtually impossible.

The wipeoff demodulator also has a large experimental difference in break-lock SNR performance between the cases of: (a) no modulation ($-17$ db), one channel PRN code ($-4.5$ db), and (c) both channels with different PRN codes ($+4$ db).

The reverse demodulator appears to be no better than wipeoff demodulator with respect to break lock, and to lock indication. The present invention state-of-the-art QPSK demodulator devices suffer from serious spurious signal problems which inhibit meaningful performance investigation. Spurious signals in a device of this type are a particular problem by virtue of the fact that the QPSK demodulator is basically a cross-correlator technique.

A step in the right direction is the recent developments in the field of the QPSK quadrupling ($\times 4$) demodulators. However, the improvements which have been achieved, have created additional problems areas. For example, the high data rates require higher receiver IF frequencies in order to handle the date bandwidths, but this causes the quadrupled output frequency to be at an unreasonably high frequency. A very wideband system may employ a 10 GHz IF but this causes the $\times 4$ signal to be at 40 GHz. Furthermore, it is difficult to build wideband $\times 4$ elements at these frequencies, and the output $\times 4$ frequency itself is hard to handle. The most common type of $\times 4$ element employs a nonlinear reactance which is subject to parametric breakup, a problem with this type of element. An improved QPSK $\times 4$ demodulator apparatus is provided with improved characteristics to overcome the above described prior art performance problems.

SUMMARY OF THE INVENTION

The present invention utilizes a pair of doubler units to provide a QPSK $\times 4$ demodulator apparatus which can distinguish between noise and a QPSK signal. The first doubler unit provides a bi-phase wave at its output which may be bandpass filtered to provide substantially the same bandwidth as the original data signal bandwidth. The second doubler performs as a bi-phase doubler unit to provide a CW output of two times twice the center frequency, $F_c$. The QPSK $\times 4$ demodulator apparatus provides an output CW signal whenever a signal is present, independent of doppler shift, modulation or lack of modulation.

It is one object of the invention, therefore, to provide an improved QPSK demodulator apparatus utilizing a two-step quadrupler process to provide a quadrature output signal.

It is another object of the invention to provide an improved QPSK demodulator apparatus using conventional doubler units that do not have the parametric breakup characteristics of a non linear reactance type of quadrupler.

It is still another object of the invention to provide an improved QPSK demodulator apparatus utilizing bandpass filtering after the first doubler unit to recover the pseudo biphase wave and to eliminate unwanted signals and noise to the second doubler unit.

It is yet another object of the invention to provide an improved QPSK demodulator apparatus wherein the output of the first doubler unit may be heterodyned to a lower frequency to enable the use of a lower frequency mixer or doubler for the second doubler unit.

These and other advantages, objects and features of the invention will become more apparent after considering the following description taken in conjunction with the illustrative embodiment in the accompanying drawings.

BRIEF DESCRIPTION OF THE DRAWINGS

FIG. 1 is a simplified block diagram of the QPSK demodulator apparatus in accordance with the present invention, FIG. 2 shows graphical representations of typical waveforms that occur during the operation of the present invention.

DESCRIPTION OF THE PREFERRED EMBODIMENT

Figure 3:
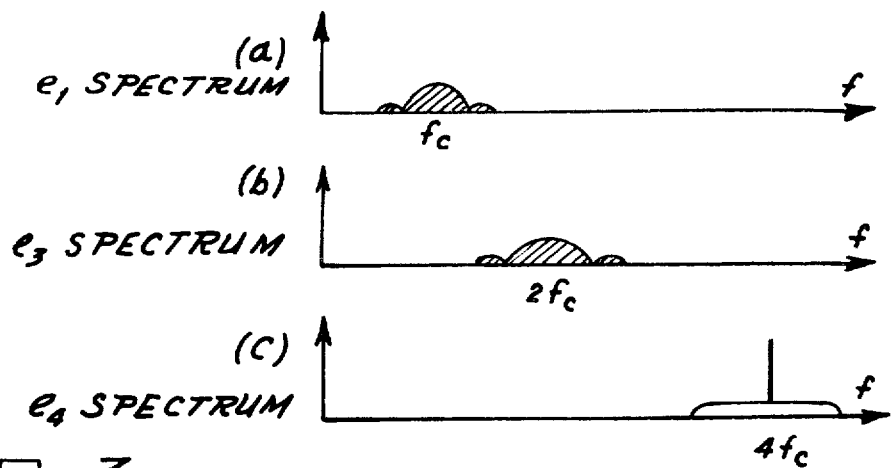
FIG. 3 is a graphical representation of the signal spectrum at designated points in the QPSK demodulator apparatus.

Referring now to FIG. 1, there is shown a simplified block diagram of the QPSK $\times 4$ (multiply by 4) demodulator apparatus utilizing a pair of doubler units 10, 12 and a bandpass filter 14. The input signal $e_1$, which is applied to the input of doubler unit 10, has a center frequency, $f_c$, and a bandwidth, B. The output signal $e_2$ from the doubler unit 10 is centered at $2 f_c$ and has a bandwidth, B. The filtered signal $e_3$ from filter unit 14 is applied to doubler unit 12 which provides an output signal $e_4$. The output $e_4$ is centered at four times the center frequency of the input signal $e_1$.

It may be seen that in its simplest form the present invention may be implemented by a pair of doubler units and a bandpass filter. A better understanding of the invention may be had by viewing the waveforms of FIG. 2 with respect to their occurence at the designated points in FIG. 1. The action of the first doubler 10 is to create a bi-phase wave $e_2$ at its output, as shown in FIG. 2c. The states 1, 1 and a 0,0 of the input wave are both turned into the same bi-phase state at 2 $f_c$, and a 0,1 and 1,0 are both turned into the other bi-phase state. Thus, the output of the first doubler 10 may be seen to comprise a bi-phase wave. Furthermore, since the transitions of this bi-phase wave occur at the same rate as the original QPSK wave, the output bi-phase wave will have the same bandwidth as the original wave and thus can be filtered by a bandpass filter 14 which has substantially the same bandwidth as the original data bandwidth. The resultant filtered wave is shown in FIG. 2(d). The second doupler 12 acts like an ordinary bi-phase doubler, producing a CW output at 4 times the center frequency $f_c$. The frequency spectrums of all the signals are shown in FIG. 3. An ordinary phase lock loop of the type commonly used with bi-phase doubler demodulators may be used to search for and to lock onto the $4f_c$ component. In the present quadrupler demodulator apparatus it may be seen that each step is independent and not related to the previous one.

The QPSK demodulator apparatus with a two-step quadrupler produces a CW signal whenever a signal is present, which is independent of doppler shift, modulation or no modulation. The actual frequency at which this CW signal appears, is a function of the doppler shift of oscillator shift in the incoming signal. No CW component will appear when the input is only amplified receiver noise, and thus the present QPSK demodulator apparatus can distinguish the difference between noise and a QPSK signal. Furthermore, the receiver noise does not produce a coherent interfering error signal. The phase lock loop which may be used with the present demodulator is an ordinary variety phase lock loop whose function is to find and to lock onto the $4f_c$ CW signal in a conventional fashion. A lock indication signal may also be provided in the conventional fashion. This signal will be related to the amplitude of the $4f_c$ signal. Thus it may be seen that the I-Q demodulator will automatically produce the quadrature outputs when the phase lock loop receiver is locked up.

Figure 4:
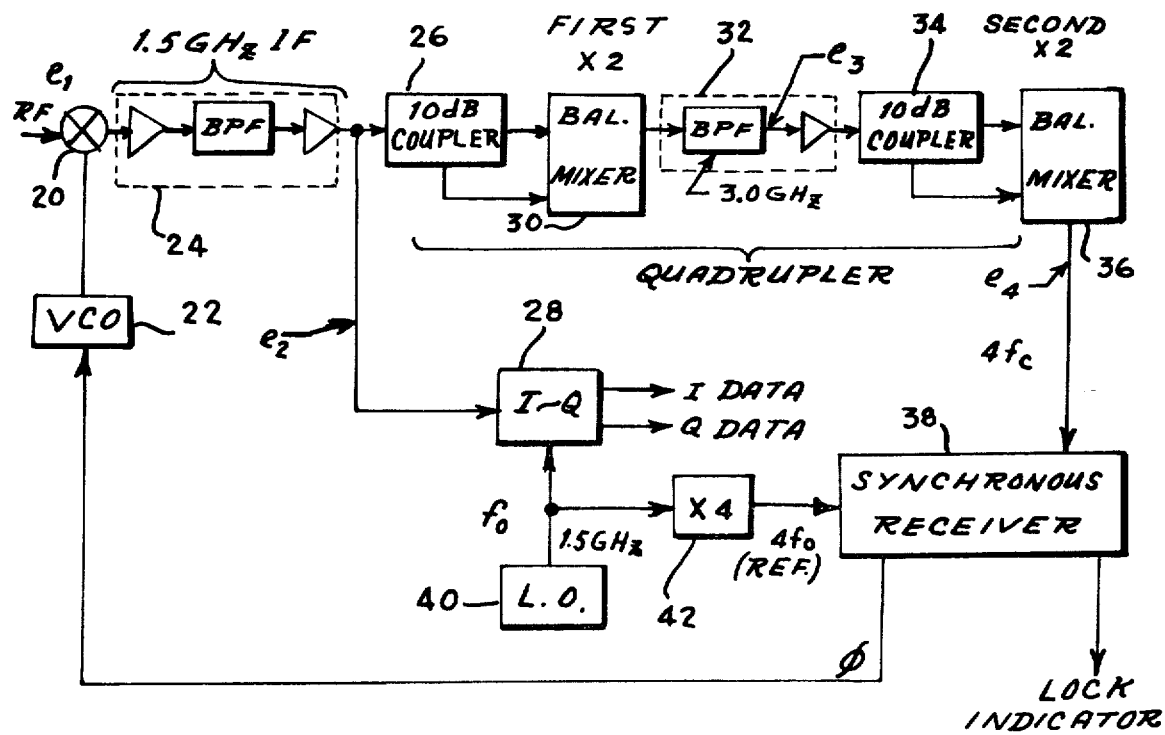
FIG. 4 is detailed block diagram of the QPSK demodulator apparatus.

Turning now to FIG. 4, there is shown a detailed block diagram of the QPSK demodulator apparatus including a phase lock loop. A received RF signal is applied to mixer 20 wherein the signal is mixed with the output frequency from the voltage controlled oscillator 22. The output signal from the mixer 20 is amplified, bandpass filtered and then further amplified in a first IF stage 24. The output from the first IF stage 24 is applied to both a 10 db coupler unit 26 and an I-Q demodulator unit 28. The 10 db coupler unit 26 provides a pair of output signals to the first doubler unit 30 which is a double-balanced mixer. The output from the mixer 30 which is bandpass filtered and amplified in unit 32, is applied to a second 10 db coupler unit 34. The second 10 db coupler unit 34 provides a pair of output signals to the second doubler unit 36 which is also a double-balanced mixer. The output of the second doubler unit 36 which is a CW signal centered at $4f_c$ is applied to synchronous receiver 38. A local oscillator 40 which provides an oscillator frequency, $f_o$ of 1.5 GHz to the I-Q demodulator unit 28, applies the 1.5 GHz signal also to a four times multiplier unit 42 which in turns provides a reference frequency of $4F_o$ to the synchronous receiver 38. The synchronous receiver 38 which provides a loop error signal to the voltage controlled oscillator 22, also provides a phase lock indication when the quadrupled signal $e_4$ and the reference frequency are synchronized.

Figure 5:
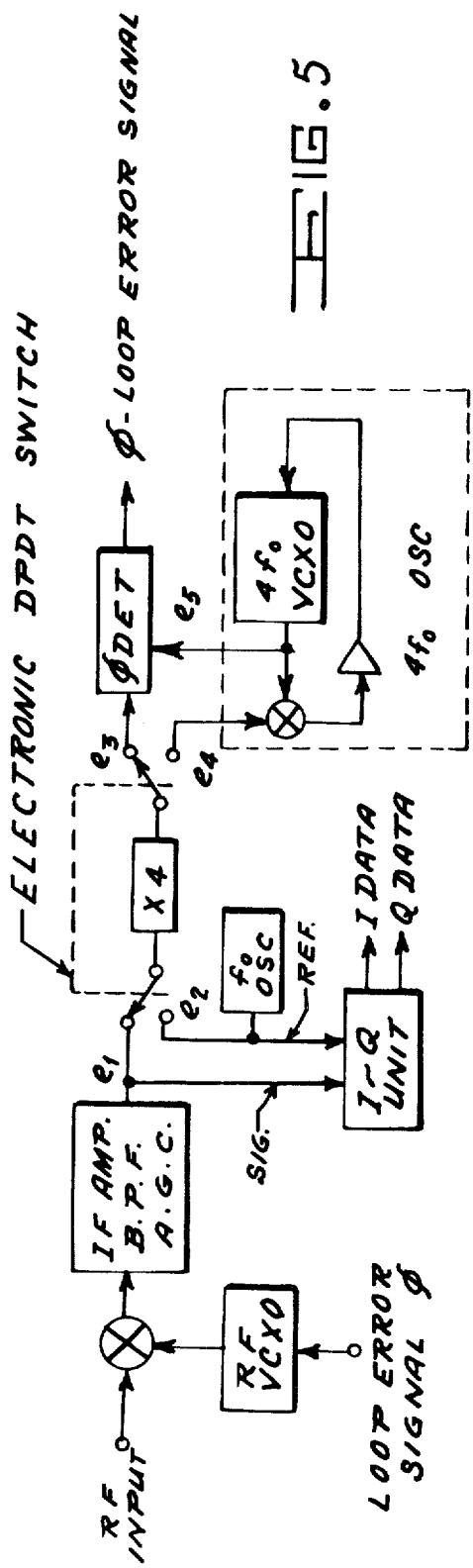
FIG. 5 is detailed block diagram of the basic time-multiplex configuration of the times four demodulator apparatus.
Figure 6:
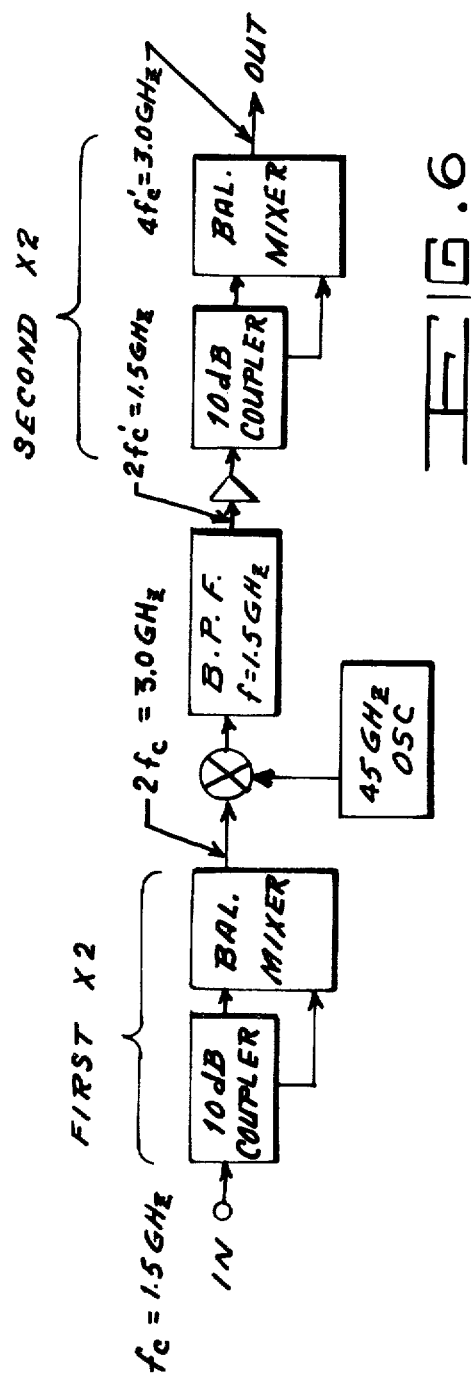
FIG. 6 is a block diagram of a times four demodulator apparatus with frequency translation to permit use of available mixer units, and, FIG. 7 is a block diagram of a times four demodulator apparatus utilizing 30 MHz offset phase detectors.

There is shown in FIGS. 5, 6 and 7 several variations of an improved form of a quadrupler demodulator, wherein the IF signal and the $f_o$ (local oscillator) signal are both quadrupled through the same ×4 chain using time-multiplexing in order to achieve phase tracking of these two signals. In other words, the input IF signal $e_1$ is normally routed through the ×4 unit to the output phase detector; but, at fixed intervals, the $f_o$ oscillator signal $e_2$ is sent through the same ×4 unit of a $4f_o$ oscillator. This quadrupled burst signal ($e_4$) synchronizes the $4f_o$ oscillator in phase with the $f_o$ oscillator. The switching repetition rate would typically be at 100 KHz, with the $f_o$ synchronizing signal passed through the ×4 unit for 1 microsecond, and the IF signal passed through the ×4 unit for 9 microseconds. Since both signals are sent through the same ×4 unit, phase tracking during the quadrupling process would then be achieved.

A further advantage of the time-multiplexing ×4 technique is that it allows the use of a variety of more practical ×4 units. There is shown in FIG. 6 a ×4 unit wherein the output of the first ×2 doupler unit is heterodyned down to a lower frequency to permit the various signals involved in this process to stay within the bandwidths of available balanced mixers. The apparatus as shown, operates very well at rates up to 150 MHz clock frequency. A trackable output CW signal is produced at an input (IF Bandwidth) SNR of −8 db, and the performance is completely independent of the modulation format. The same results were obtained when the original signal had no modulation, or one channel PRN modulation, or both channels had independent PRN codes impressed. The apparatus, as shown, did not employ a complete phase lock loop, and, therefore, estimates of the achieved performance, in terms of input IF bandwidth SNR, were made by observing the signal and the noise output of the quadrupler on a spectrum analyzer and estimating the equivalent loop SNR if a phase lock loop had been employed to track the output CW signal. It may be noticed that the time-multiplex technique which is shown in FIG. 5 is particularly suitable for use with this frequency translating type of ×4 unit, since both the IF signal and the local oscillator signal are passed through the same path.

There is shown in FIG. 7 a variation of the time-multiplex technique which allows the use of a 30 MHz, high scale factor, phase detector. The high frequency synchronized oscillator is caused to operate at a frequency which is offset from the $4f_o$ frequency by 30 megacycles. The high frequency phase detectors in both the oscillator unit (MI) and in the output circuit (M2) can be operated with the desired output signal at 30 MHz instead of at DC, and thus most of the loop gain can occur at 30 megacycles instead of at DC for both the synchronized VCO unit itself, and for the complete QPSK demodulator phase lock loop. This offset technique is commonly used in most high frequency commercial synchronized oscillators. The particular advantage of the time-multiplex technique in relation to the use of an offset phase detector approach is that it can be implemented with no additional RF hardware, over and above that required for the apparatus shown in FIG. 5. The advantages of the offset technique include, in particular, high scale factor, no low level DC amplifiers, and virtually zero DC offset drift.

The advantages of a ×4 QPSK demodulator as compared to a modulation wipeoff or a reverse demodulator is quite apparent. Each step is independent and not related to the previous one. The quadrupler produces a CW signal at $4f_c$ whenever an external signal is present, independent of doppler shift, modulation or no modulation, etc. The actual frequency at which this CW signal appears is, of course, a function of the doppler shift or oscillator shift in the incoming signal and no CW component will appear when the input is amplified receiver noise. The phase lock loop is an ordinary phase lock loop whose function is to find and to lock onto the $4f_c$ CW signal in a conventional fashion. A lock indication signal is also provided in the conventional fashion; this signal is related to the amplitude of the $4f_c$ signal.

The I-Q demodulator automatically produces the quadrature outputs when the phase lock loop receiver is locked up. The present apparatus can distinguish the difference between amplified receiver noise and a true QPSK input signal whereas the wipe-off demodulator cannot. Furthermore, it provides a reliable lock-on indication signal only when a QPSK input signal has been locked onto. It provides a no-lock indication on amplified receiver noise, or on an unlocked QPSK input signal. Thus, additive receiver noise does not produce a coherent interfering error signal in the presence of a weak QPSK signal, unlike the wipe-off system.

The two-step ×4 quadrupler demodulator apparatus has the inherent advantage that conventional ×2 devices such as commercial wideband doublers or commercial doubly-balanced mixers can be used for each doubling unit. The two-step ×4 process does not have the parametric breakpu problem which characterize the nonlinear reactance type of quadrupler. Bandpass filtering can be used after the first doubler to recover the pseudo-biphase wave, and thus eliminate undesired signals and noise inputs to the second doubler. The output of the first doubler can be frequency translated in various ways including, in particular, heterodyned to a lower frequency in order to allow the use of a lower frequency commercially available mixer or doubler for the second ×2.

The time-multiplex quardrupling technique provides a very low phase error between the local oscillator reference signal and the input signal which is independent of temperature and other distortion factors. For particular application of special two-step quadrupler units it is possible to heterodyne the multiplexed IF signal down to a lower frequency before the first ×2 step, or to heterodyne the output of the first ×2 unit to a lower frequency, or even to heterodyne the ×4 output to a lower frequency before demultiplexing the two signals prior to performing the final phase comparison.

Although the invention has been described with reference to a particular embodiment, it will be understood to those skilled in the art that the invention is capable of a variety of alternative embodiments within the spirit and scope of the appended claims.

What is claimed is:

1. A quadrupler demodulator apparatus comprising in combination:
    a first doubler unit to receive an input signal, said input signal having a center frequency with a predetermined bandwidth, said first doubler unit doubling said input signal to provide a first bi-phase output signal, said first bi-phase output signal being centered at twice the center frequency of said input signal and having substantially the same predetermined bandwidth as said input signal,
    a bandpass filter unit receiving said first bi-phase output signal, said bandpass filter unit having the same bandwidth as said predetermined bandwidth of said input signal, said bandpass filter unit filtering out and removing any undesired cross products, said bandpass filter unit recovering and maintaining said first bi-phase output signal, said bandpass filter unit providing said first bi-phase output signal as an output,
    a second doubler unit connected to said bandpass filter unit to receive said first bi-phase output signal as an input signal, said doubler unit doubling said first bi-phase output signal to provide a CW output signal, said CW output signal being centered at four times the center frequency of said input signal, and
    a phase lock loop connected between the output of said second doubler unit and the input of said first doubler unit, said phase lock loop receiving said CW output signal, said phase lock loop generating a reference signal which has a frequency of four times the center frequency of said input signal, said phase lock loop generating a phase error signal which is responsive to the relationship between said CW output signal and said reference signal.

2. A quadrupler demodulator apparatus as described in claim 1 wherein said first and second doubler units are double-balanced mixers.

3. A quadrupler demodulator apparatus as described in claim 1 wherein the output of said first doubler unit is frequency translated by heterodyning to a lower frequency thereby permitting the use of a lower frequency mixer unit for the second doubler unit.

4. A quadrupler demodulator apparatus as described in claim 1 further including a time multiplexer unit to multiplex the input signal and the reference frequency to provide a time multiplexed signal, time multiplex signal is utilized for quadrupling both the input signal and the reference frequency through the same four time multiplex chain, thereby achieving phase tracking of the two signals.

5. A quadrupler demodulator apparatus as described in claim 4 wherein said time multiplexed signal is heterodyned to a lower frequency before the first doubling unit.

6. A quadrupler demodulator apparatus as described in claim 4 wherein the output signal from said first doubler unit is heterodyned to a lower frequency.

7. A quadrupler demodulator apparatus as described in claim 5 wherein the output signal from siad second doubler unit is heterodyned to a lower frequency before demultiplexing the two signals prior to performing the final phase comparison.

* * * * *